US006830252B2

(12) United States Patent
Eberlein et al.

(10) Patent No.: US 6,830,252 B2
(45) Date of Patent: Dec. 14, 2004

(54) DEPOSIT LOCK FOR A TROLLEY

(75) Inventors: Herbert Eberlein, Bubesheim (DE); Kurt Deyerler, Illertissen (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 61 days.

(21) Appl. No.: 10/252,051

(22) Filed: Sep. 23, 2002

(65) Prior Publication Data

US 2004/0056437 A1 Mar. 25, 2004

Related U.S. Application Data

(63) Continuation of application No. PCT/DE01/04379, filed on Nov. 20, 2001.

(30) Foreign Application Priority Data

Jan. 30, 2001 (DE) .......................................... 101 03 916

(51) Int. Cl.$^{7}$ .................................................. B62B 5/00

(52) U.S. Cl. .................... 280/33.994; 194/905; 70/57.1

(58) Field of Search ....................... 280/33.994, 33.992, 280/33.991; 194/905; 70/57.1, 58, DIG. 41

(56) References Cited

U.S. PATENT DOCUMENTS

| | | | | | |
|---|---|---|---|---|---|
| 4,474,282 | A | * | 10/1984 | Lenander | 194/247 |
| 4,573,564 | A | * | 3/1986 | Rheeder et al. | 194/250 |
| 4,589,538 | A | * | 5/1986 | Payraudeau | 194/205 |
| 4,645,057 | A | * | 2/1987 | Schramme et al. | 194/246 |
| 4,691,816 | A | * | 9/1987 | Trubiano | 194/212 |
| 5,040,656 | A | * | 8/1991 | DiPaolo et al. | 194/212 |
| 5,121,823 | A | | 6/1992 | Wanzl | |
| 5,131,517 | A | * | 7/1992 | DiPaolo et al. | 194/257 |
| 5,220,987 | A | * | 6/1993 | DiPaolo et al. | 194/212 |
| 5,236,073 | A | * | 8/1993 | DiPaolo et al. | 194/212 |
| 5,540,316 | A | * | 7/1996 | DiPaolo et al. | 194/212 |
| 5,573,097 | A | * | 11/1996 | Merchel | 194/212 |
| 5,836,596 | A | | 11/1998 | Wanzl | |
| 5,950,792 | A | * | 9/1999 | DiPaolo | 194/212 |
| 5,951,029 | A | | 9/1999 | Sonnendorfer et al. | |
| 6,250,451 | B1 | * | 6/2001 | Thirkill | 194/205 |

FOREIGN PATENT DOCUMENTS

| | | | | |
|---|---|---|---|---|
| DE | 9313499 | U1 | | 9/1993 |
| DE | 004230361 | A1 | * | 3/1994 |
| DE | 004320932 | A1 | * | 1/1995 |
| DE | 019814062 | A1 | * | 10/1999 |
| DE | 299 13 771 | U1 | | 11/1999 |
| DE | 199 28 463 | A1 | | 12/2000 |
| EP | 0844592 | A2 | * | 5/1998 |
| FR | 2 721 127 | | | 12/1995 |
| JP | 911909 | A | * | 9/1997 |

OTHER PUBLICATIONS

Wanzl Metallwarenfabrik GmbH, Münzpfandsystem euroloc, Brochure No. 378/97 (1997).

* cited by examiner

*Primary Examiner*—Christopher P. Ellis
*Assistant Examiner*—Jeff Restifo
(74) *Attorney, Agent, or Firm*—Burns, Doane, Swecker & Mathis, L.L.P.

(57) ABSTRACT

A deposit lock (1) for a trolley (15), includes a fixing member (4) for fixing to a supporting part (16) on the trolley (15) and including an intermediate member (6) connected to the fixing member (4) and intended to be fixed or supported on the handlebar (18) of the trolley (15), wherein the deposit lock (1) includes a coupling device (2) and a coupling member (3) provided for coupling to the deposit lock (1) of a further, like trolley (15) and wherein the fixing member (4) is extended in the direction of the handlebar (18) by a portion (5), and the intermediate member (6) is extended in the direction of the supporting part (16) by a portion (7). The portions (5, 7) are arranged so as to overlap one another and the coupling device (2) is arranged in at least one of the portions (5, 7).

25 Claims, 3 Drawing Sheets

DEPOSIT LOCK FOR A TROLLEY

CROSS-REFERENCE TO RELATED APPLICATIONS

The present application is a continuation of PCT/DE01/04379, which claims the priority of DE 101 03 916.6, filed in Germany on Jan. 30, 2001, and the contents of both applications are hereby incorporated herein by reference.

BACKGROUND OF THE INVENTION

1. Filed of the Invention

The invention relates to a deposit lock for a trolley, and in particular a shopping trolley.

2. Discussion of Related Art

German utility model 93 13 499 U 1 describes a trolley fitted with a deposit lock arranged between a correspondingly shortened handlebar and one of the two supporting parts of the trolley. The deposit lock is connected to the handlebar and screwed to a cap provided on the supporting parts.

Trolleys which are not in use, in particular shopping trolleys, are coupled together and parked in rows by means of deposit locks. These rows or partial rows of trolleys often have to be pushed from one parking area to another, particularly when the trolleys are removed and returned nonuniformly, with the result that there are suddenly not enough trolleys available at a given parking area. When rows of trolleys are pushed, turns inevitably also have to be negotiated, as a result of which tremendous tensile forces are exerted on the coupling members, which are provided on chains, and these tensile forces act in the longitudinal direction of the chains. Ultimately, these forces have to be absorbed by the deposit locks and thus by the individual trolleys. The structure formed as a plug-and-socket connection and shown in FIG. 2 of the aforementioned utility model is in need of improvement with respect to the tensile forces described. The connection between the deposit lock and the cap provided on a supporting part is relatively short in the direction of the longitudinal axis of the handlebar, with the result that the proposed connection is likely at least to be loosened when the tensile forces acting transversely to the handlebar arise.

OBJECTS AND SUMMARY

An object of the invention is to develop further a deposit lock of the present type which is capable of absorbing externally acting forces, in particular the above-described tensile forces, without being damaged and so that the coupling device can advantageously be housed in the deposit lock.

The object is achieved in that portions of the fixing member and an intermediate member are arranged so as to overlap one another and in that the coupling device is arranged in at least one of the portions.

By means of the overlapping arrangement of the said portions, the portions can have relatively long dimensions, thereby forming large mutual supporting surfaces which are capable of absorbing forces acting externally on the deposit lock, in particular tensile forces acting in the longitudinal direction of the trolleys and on the deposit lock via the coupling member of a further coupled trolley, without being damaged. The portions of the fixing member and the intermediate member advantageously overlap in an interlocking manner so that forces acting transversely to the overlap are controllable without causing any damage. In this way, it is also possible to house the coupling device in at least one of the portions since the fixing member and the intermediate member can be dimensioned so that deformation of these members under the influence of forces does not have to be feared. Consequently, the coupling device is not exposed to any bending forces.

In one embodiment, the portions overlap in one plane throughout. However, it is more advantageous if the portions overlap in at least two different planes so that the connection produced between the fixing member and the intermediate member is extremely stable. For reasons of stability, it also proves advantageous if the length of the overlap measured in the longitudinal direction of the handlebar is greater than the width of the coupling device measured in the same direction.

DETAILED DESCRIPTION OF THE PREFERRED EMBODIMENTS

Figure 1:
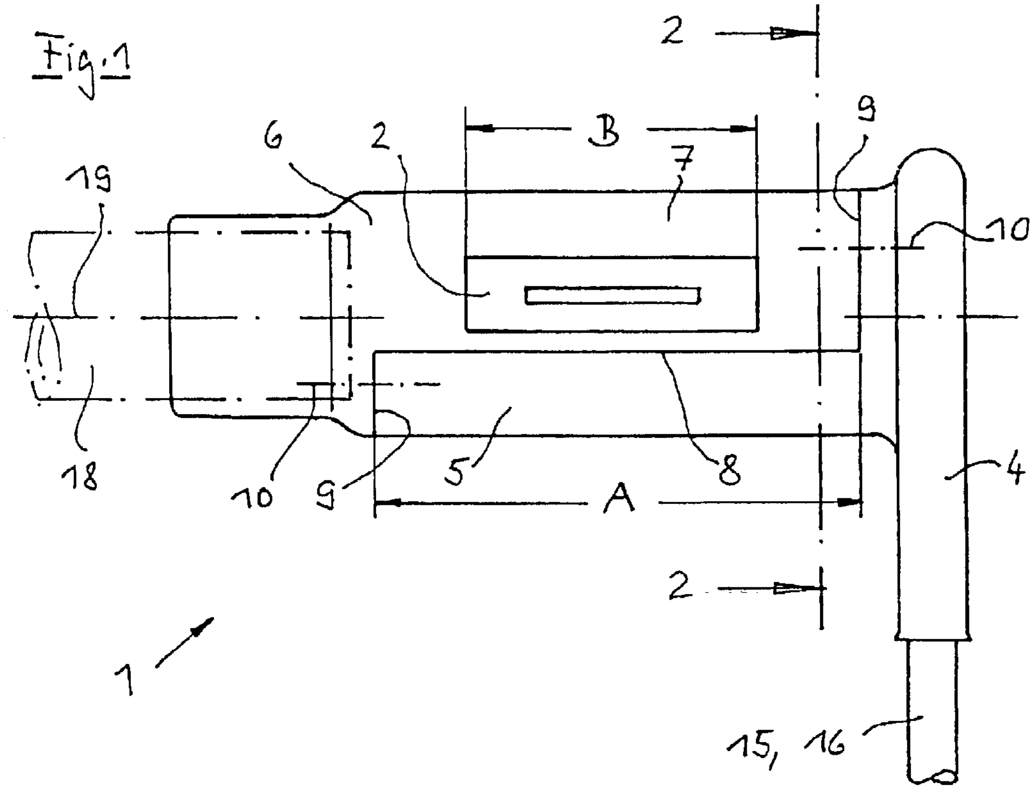
FIG. 1 shows a deposit lock.

FIG. 1 shows a deposit lock 1 seen from the side from which a deposit (coin, card or the like) is introducible into a known coupling device 2 provided in the deposit lock 1. An opening for receiving the coupling member 3 of a further trolley is arranged on the side of the deposit lock 1 not seen in FIG. 1.

The deposit lock 1 comprises a fixing member 4 permanently fixed to a supporting part 16 on a trolley 15. The deposit lock 1 is also provided with an intermediate member 6 pushed onto the end of a handlebar 18 on the trolley 15. The fixing member 4 has a preferably horizontal portion 5 which is extended toward the handlebar 18. The intermediate member 6 has a portion 7 which is extended preferably horizontally toward the supporting part 16.

The portions 5, 7 are arranged so as to mutually overlap and are detachably connected to one another by means of this usually horizontally extending overlap 8. The portions 5, 7 can be screwed or pinned together or can also be interlocked in various known ways.

The coupling device 2 of the deposit lock 1 can comprise individual components and/or assemblies to be mounted or can also be formed by a cassette-type structural unit which is housed in a chamber (not shown in further detail) in the deposit lock 1. In the example, the coupling device 2 is arranged completely within the portion 7 of the intermediate member 6. The coupling device 2 can also additionally occupy the fixing member 4. It is also possible to house the coupling device 2 exclusively within the portion 5 of the fixing member 4. In the example, the length A of the overlap 8 measured in the axial direction of the handlebar 18 is greater than the width B of the coupling device 2, formed as a cassette in the example, measured in the same direction.

Figure 5:
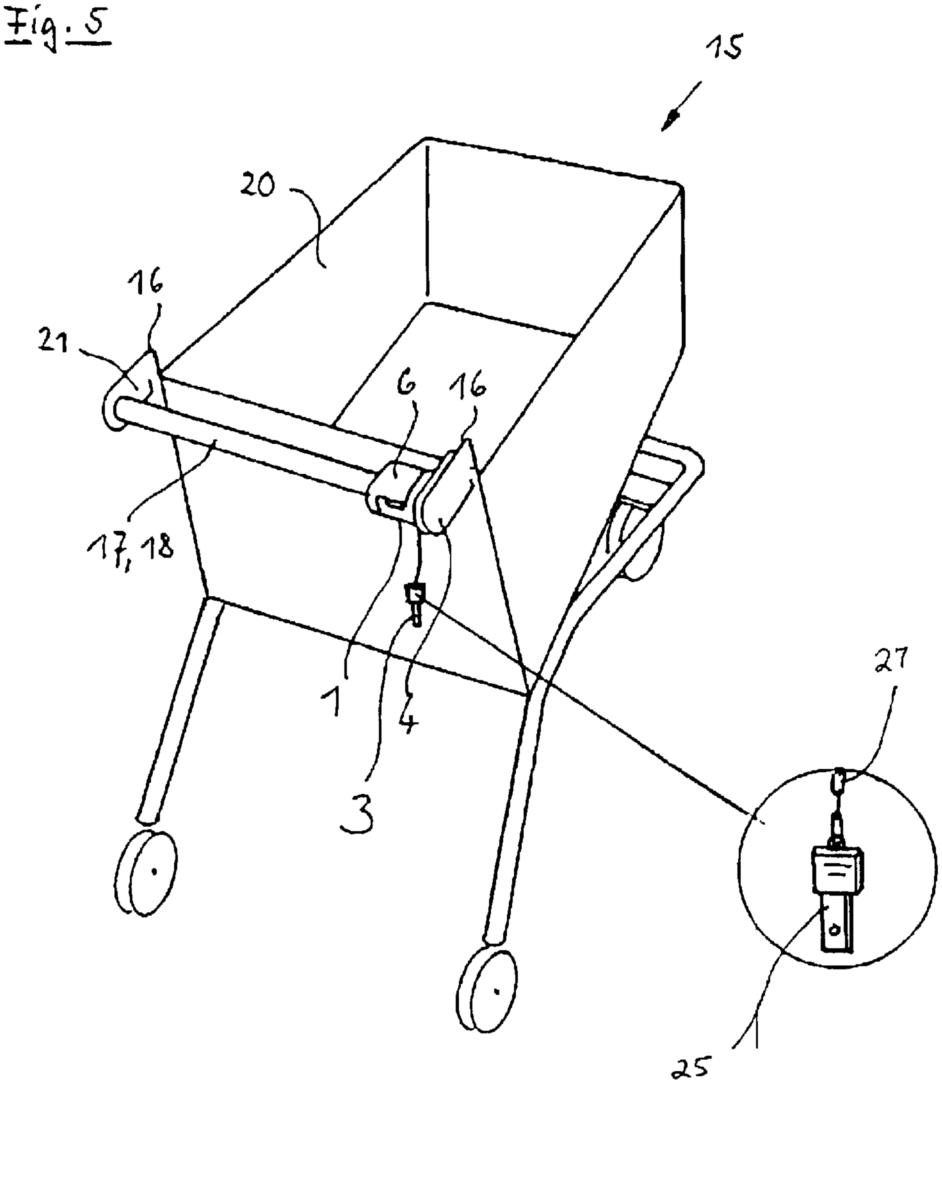
FIG. 5 shows a deposit lock mounted on the right-hand side of a trolley formed as a shopping trolley.

At a suitable point, the deposit lock 1 carries a known coupling member 3 which comprises a type of key 25 fixed to a flexible component, e.g., a chain 27, the flexible component also being provided on the deposit lock 1; see FIG. 5. In the drawing, the reference numerals 10 designate two horizontally extending, dot-dash line segments which traverse two common vertical or substantially vertical connecting surfaces 9 of the fixing member 4 and the intermediate member 6. The line segments 10 are intended to indicate known locking means, with the aid of which the fixing member 4 and the intermediate member 6 can additionally be secured after they have been connected. The common connecting surfaces extending from the horizontally extending overlap 8 can naturally also be regarded as a further part of the overlap 8. Thus the overlap 8 is not necessarily formed only by the horizontal portion evident from the drawings. This becomes clear, e.g., when FIG. 1 is rotated through 90'. The overlap 8 of the fixing member 4 and the intermediate member 6 is then substantially Z-shaped, i.e., angular. The fixing member 4 and the intermediate part 6 can essentially be connected in various ways. The decisive factor is the way in which they are interlocked.

Figure 2:
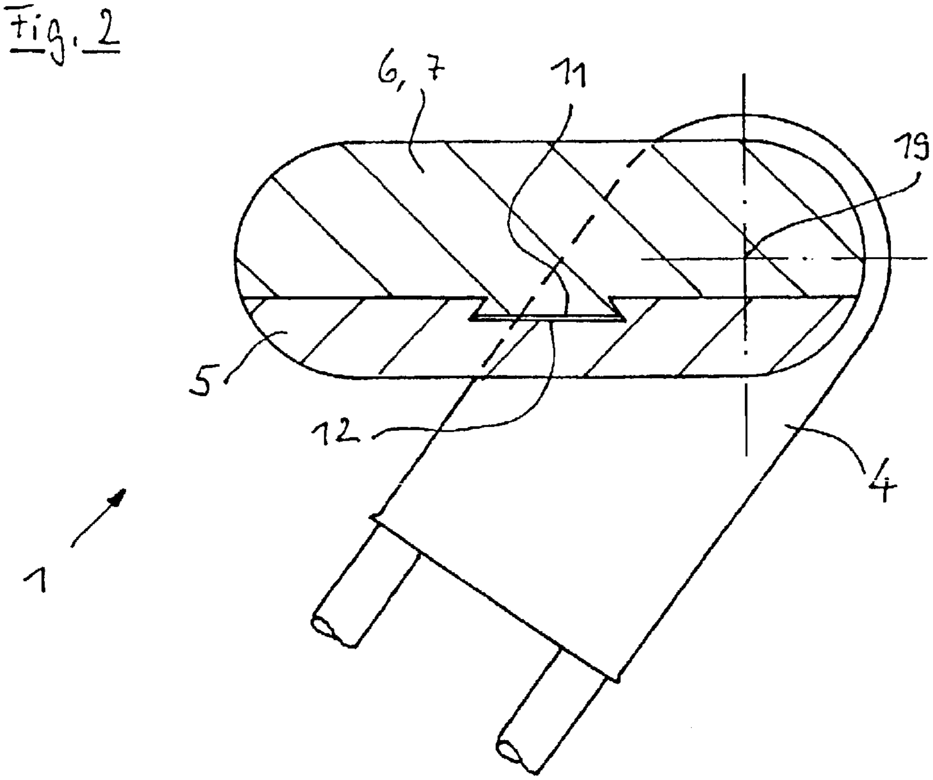
FIG. 2 shows a sectional view along the line 2—2 in FIG. 1.

FIG. 2 shows a cross-section of the deposit lock 1 along the line 2—2 of FIG. 1. On its portion 7, the intermediate member 6 has a dovetailed tongue 11 extending parallel to the longitudinal axis 19 of the handlebar 18. The tongue 11 is inserted in an interlocking manner into a dovetailed groove 12 in the portion 5 of the fixing member 4. The fixing member 4 and the intermediate member 6 are connected longitudinally relative to the handlebar 18, i.e., horizontally.

Figure 3:
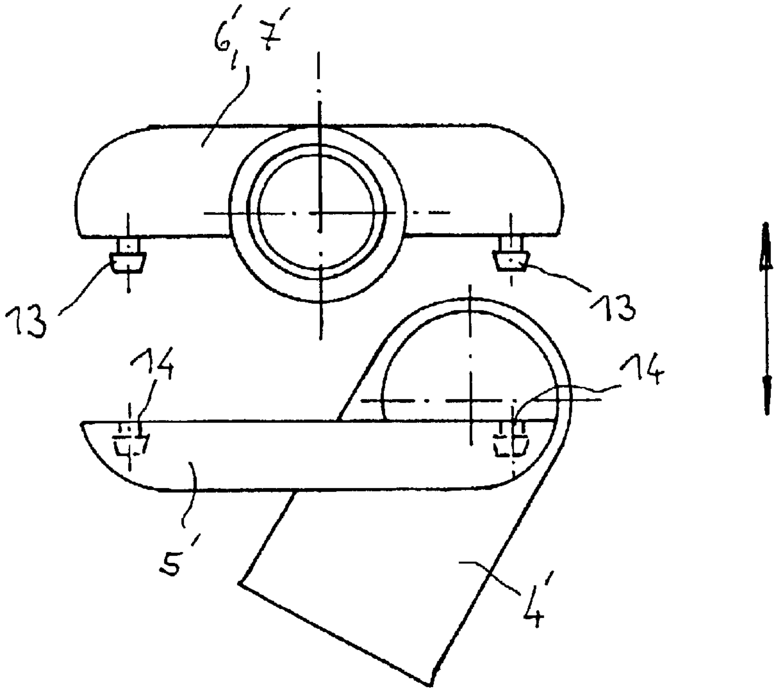
FIG. 3 shows a further embodiment.

An alternative embodiment is shown in FIG. 3. In the alternative embodiment, elements not shown are the same as or similar to elements in the first preferred embodiment illustrated in FIGS. 1 and 2. Projections 13 provided with undercuts are provided on the underside of the portion 7' of the intermediate member 6'. The projections 13 are intended to be lockably inserted into openings 14 in the upper side of the portion 5' of the fixing member 4'. In this case, the fixing member 4' and the intermediate member 6' are connected vertically; see the double arrow.

Figure 4:
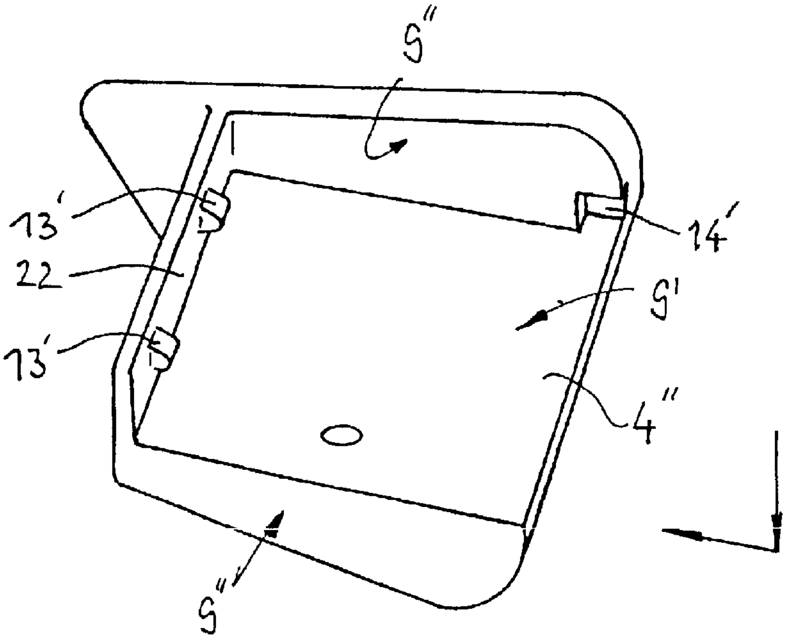
FIG. 4 shows a perspective view of a fixing member.

FIG. 4 shows a perspective view of a further embodiment of a fixing member 4". In the alternative embodiment, elements not shown are the same as or similar to elements in the first preferred embodiment illustrated in FIGS. 1 and 2. A horizontal surface 9' is visible from above and is arranged between the two vertical connecting surfaces 9". These surfaces correspond to surfaces 9 in FIG. 1. On the side on which the coupling member of a further trolley is inserted into the deposit lock, the fixing member has a wall 22 extending parallel to the longitudinal direction of the handlebar. When the intermediate member (corresponding to element 6 in FIG. 1) is attached to the fixing member 4", the intermediate member is supported against the wall 22 and thus against the fixing member 4" transversely to the longitudinal direction of the handlebar, the common connecting surfaces 9', 9" of the fixing member 4" and the intermediate member then resting against one another and the overlap being formed as described with regard to the embodiment in FIG. 1.

In the example, two conically formed projections 13 are provided on the inside of the wall 22 and a recess 14' is formed at the front end of the higher connecting surface 9". Recesses for receiving the projections 13' and a projection for insertion into the recess 14' are provided at appropriate points on the intermediate member (not shown) to be attached. The projections and recesses form common connecting parts intended to lock the fixing member 4" and the intermediate member (not shown) together with positional accuracy and accuracy of fit.

The intermediate member is initially placed onto the fixing member 4" so as to be offset, i.e., the intermediate member is placed downwards onto the fixing member 4" from above, displaced slightly to the right in the drawing, so that the common connecting surfaces 9', 9" rest against one another and the overlap is largely formed. The intermediate member is then pushed towards the wall 22, to the left in the drawing, so that a positive connection is produced between the fixing member 4" and the intermediate member by means of the aforementioned projections and recesses. In this embodiment, the connection process first takes place vertically and then horizontally; see angled double arrow.

FIG. 5 shows a trolley 15 formed as a shopping trolley, the deposit lock 1 of which is arranged on the right-hand side of the pushing arrangement 17 of the trolley 15. The fixing member 4 is attached to the supporting part 16 being part of the basket 20. The intermediate member 6, which is positively connected to the fixing member 4, is pushed with a precise fit onto the right-hand end of the handlebar 18. The left-hand end of the handlebar 18 ends in a cap 21 which is mounted on a further supporting part 16 on the opposite side of the basket 20 and is secured to this further supporting part 16.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A trolley having a deposit lock, comprising:

a handlebar;

a supporting part;

a fixing member for attachment to the supporting part on the trolley;

an intermediate member for attached to the handlebar of the trolley;

the fixing member and the intermediate member are connected by common connecting surfaces;

a coupling device; and a coupling member provided for coupling to a coupling device of another trolley;

the fixing member includes a portion that extends toward the handlebar;

the intermediate member extends toward the supporting part; and the fixing member and the intermediate member are arranged so as to overlap each other.

2. The deposit lock according to claim 1, wherein the portion of the fixing member and the intermediate members are connected to one another in an interlocking or snap-locking manner by means of the overlap.

3. The deposit lock according to claim 1, wherein the overlap extends horizontally.

4. The deposit lock according to claim 1, wherein the overlap extends in an angular manner.

5. The deposit lock according to claim 1, wherein a length of the overlap measured in an axial direction of the handlebar is greater than a width of the coupling device measured in the same direction.

6. The deposit lock according to claim 1, wherein the connecting surfaces are arranged vertically.

7. The deposit lock according to claim 1, wherein the connecting surfaces are arranged substantially vertically.

8. The deposit lock according to claim 1, wherein the intermediate member is supported on the fixing member transversely to a longitudinal direction of the handlebar.

9. The deposit lock according to claim 1, wherein the connecting surfaces provided on the fixing member and the intermediate member lock the fixing member and the intermediate member together.

10. The deposit lock according to claim 1, wherein the fixing member and the intermediate member are additionally screwed or pinned together.

11. The deposit lock according to claim 1, wherein the common connecting surfaces include planar portions.

12. A deposit lock for a trolley, comprising:

a fixing member for attachment to a supporting part on the trolley;

an intermediate member to be fixed to a handlebar of the trolley;

the fixing member and the intermediate are connected by common connecting surfaces;

a coupling device; and a coupling member provided for coupling to a coupling device of another trolley;

the fixing member includes a portion that is adapted to extend toward the handlebar when the fixing member is attached to the supporting part of the trolley;

the intermediate member extends toward the supporting part when the intermediate member is fixed to the handlebar; and the fixing member and the intermediate member are arranged so as to overlap each other.

13. The deposit lock according to claim 12, wherein the portion of the fixing member and the intermediate members are connected to one another in an interlocking or snap-locking manner by means of the overlap.

14. The deposit lock according to claim 12, wherein the overlap extends horizontally.

15. The deposit lock according to claim 12, wherein the overlap extends in an angular manner.

16. The deposit lock according to claim 12, wherein a length of the overlap measured in an axial direction of the handlebar is greater than a width of the coupling device measured in the same direction.

17. The deposit lock according to claim 12, wherein the connecting surfaces are arranged vertically.

18. The deposit lock according to claim 12, wherein the connecting surfaces are arranged substantially vertically.

19. The deposit lock according to claim 12, wherein the intermediate member is supported on the fixing member transversely to a longitudinal direction of the handlebar.

20. The deposit lock according to claim 12, wherein the connecting surfaces provided on the fixing member and the intermediate member are intended to lock the fixing member and the intermediate member together.

21. The deposit lock according to claim 12, wherein the process of connecting the fixing member and the intermediate member takes place horizontally.

22. The deposit lock according to claim 12, wherein the process of connecting the fixing member and the intermediate member takes place vertically.

23. The deposit lock according to claim 12, wherein the process of connecting the fixing member and the intermediate member takes place vertically and horizontally.

24. The deposit lock according to claim 12, wherein the fixing member and the intermediate member are additionally screwed or pinned together.

25. The deposit lock according to claim 12, wherein the common connecting surfaces include planar portions.

* * * * *